ized by the user at a time of storing the file. The image
forming device includes a storage part including a folder to
store print files transmitted from external apparatuses, a user
interface to set a storage environment of the folder so that the
file name of the print file can be modified, a controller to
control the file name to be modified and stored in the folder
according to the set storage environment, when the print file
is stored in the folder. When the file name of the print file
transmitted from the external apparatuses is stored in a pre-
determined order according to the file name or a folder name
designated by the user, it is possible to automatically modify
and store the file name of the print file without input by the
user.

(12) United States Patent
Lee (10) Patent No.: US 8,134,735 B2
(45) Date of Patent: Mar. 13, 2012

(54) IMAGE FORMING DEVICE WITH STORAGE, PRINTING SYSTEM, AND PRINT-FILE STORAGE METHOD THEREOF THE RENAMES FILES

(75) Inventor: Geun-chul Lee, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1365 days.

(21) Appl. No.: 11/708,013

(22) Filed: Feb. 20, 2007

(65) Prior Publication Data

US 2008/0024817 A1 Jan. 31, 2008

(30) Foreign Application Priority Data

Jul. 26, 2006 (KR) ........................ 10-2006-0070098

(51) Int. Cl.
*G06K 15/00* (2006.01)
*H04N 5/225* (2006.01)
(52) U.S. Cl. .................................. 358/1.16; 348/207.2
(58) Field of Classification Search ................. 358/1.16; 348/207.2
See application file for complete search history.

(56) References Cited

U.S. PATENT DOCUMENTS

| 7,640,243 | B2 * | 12/2009 | Ogata ................................. 1/1 |
| 2002/0049748 | A1 * | 4/2002 | Iki et al. ............................ 707/2 |
| 2004/0036895 | A1 * | 2/2004 | Yano et al. ..................... 358/1.6 |
| 2004/0230966 | A1 * | 11/2004 | Morris et al. ................. 717/169 |

FOREIGN PATENT DOCUMENTS

JP 2003-271614 9/2003

* cited by examiner

*Primary Examiner* — Twyler Haskins
*Assistant Examiner* — Fred Guillermety
(74) *Attorney, Agent, or Firm* — Stanzione & Kim, LLP (57) ABSTRACT

An image forming device and a print file storage method thereof, in which a file name of a print file transmitted from a host apparatus can be automatically modified to a file name designated by the user at a time of storing the file. The image forming device includes a storage part including a folder to store print files transmitted from external apparatuses, a user interface to set a storage environment of the folder so that the file name of the print file can be modified, a controller to control the file name to be modified and stored in the folder according to the set storage environment, when the print file is stored in the folder. When the file name of the print file transmitted from the external apparatuses is stored in a predetermined order according to the file name or a folder name designated by the user, it is possible to automatically modify and store the file name of the print file without input by the user.

28 Claims, 5 Drawing Sheets

| ORDER | FOLDER NAME | REPRESENTATIVE NAME | DATE | FILE NAME DESIGNATION MODE | ... |
|---|---|---|---|---|---|
| | A FIELD | | B FIELD | | |
| 1 | ZOO | WITH 'A' | 2006.06.28 | ON | ... |
| 2 | ... | ... | ... | ... | ... |
| | ... | ... | ... | ... | ... |
| | ... | ... | ... | ... | ... |
| | ... | ... | ... | ... | ... |

FIG. 5

IMAGE FORMING DEVICE WITH STORAGE, PRINTING SYSTEM, AND PRINT-FILE STORAGE METHOD THEREOF THE RENAMES FILES

CROSS-REFERENCE TO RELATED APPLICATIONS

This application claims priority under 35 U.S.C. §119(a) of Korean Patent Application No. 10-2006-0070098, filed on Jul. 26, 2006, in the Korean Intellectual Property Office, the entire disclosure of which is hereby incorporated by reference.

BACKGROUND OF THE INVENTION

1. Field of the Invention

The present general inventive concept relates to an image forming device and a print file storage method thereof. More particularly, the present general inventive concept relates to an image forming device, a printing system, and a print file storage method thereof, which automatically modifies and stores a file name of a print file to a desired name provided by a user when the print file is transmitted from external apparatuses.

2. Description of the Related Art

Generally, image forming devices print image data received from a host apparatus onto recording paper. Such image forming devices may include, for example, duplicators, printers, facsimile machines or multi function peripherals (MFPs) which combine the functions of the preceding apparatuses in one apparatus.

As scientific techniques such as semiconductor technologies, data compression technologies or the like have been developed, image forming devices have come to include a storage medium, such as a hard disk drive (HDD) or a flash memory, which have a predetermined storage capacity, due to a diversification of user needs.

Image forming devices including such storage media modify and store print files transmitted from various host apparatuses such as digital cameras, camcorders, personal digital assistants (PDAs) or the like, to print the stored print file onto recording paper, or to provide functions of an electronic album, such as arranging and ordering the transmitted print files.

In general, in order to print the print files transmitted from the above-described host apparatuses or to use functions of an electronic album, the image forming device stores the print files in the storage medium. However, when a received print file has the same name as those of existing stored print files, errors occur due to file name conflict, resulting in existing storage files being deleted or names of received files being simplified.

For example, host apparatuses such as digital cameras are manufactured so that self-captured images sequentially have a file name including an inherent name and a file extension, such as DSCSEC00001.JPG. After the images are transmitted to and stored in an image forming device, and a memory of a digital camera is reset, newly captured image files have the same name as those of the previously stored images. When the new image files are transmitted to the image forming device, print files having the same name as the names of formed print files are already prestored, and thus the above-described problems occur.

In order to solve these problems, a user can use a host apparatus such as a computer or an interface panel of the image forming device to modify file names of print files provided to the image forming device. However, this causes user inconvenience when print files are stored in the image forming device, and accordingly it is not easy to use the image forming device.

Additionally, prestored files are deleted due to overlapping file names, or names of files subsequently stored are simplified, so that it is difficult for a user to select a desired file during printing.

SUMMARY OF THE INVENTION

The present general inventive concept provides a printing system and an image forming device in which a file name of a print file transmitted from a host apparatus can be automatically modified to a file name designated by a user when being stored.

The present general inventive concept provides a print file storage method of an image forming device.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept are achieved by providing an image forming device including a storage part and a controller. The storage part includes a folder to store a print file. When the print file is stored in the folder, the controller modifies a file name of the print file according to settings of a storage environment in the folder.

The image forming device may further include a communication interface which communicates with an external apparatus to receive the print file, and the controller may store the received print file in the folder included in the storage part.

The controller may modify the file name of the print file to either the folder name or the file name set in the storage environment.

The image forming device may further include a user interface which sets the storage environment of the folder. If a file name designation mode which modifies the file name of the print file is set using the user interface, the controller may modify the file name of the print file.

In this case, if an additional name designation mode which provides an additional name of the print file is set using the user interface, the controller may provide the additional name to either the original name or the modified file name of the print file.

The additional name may include at least one selected from an identification number sequentially provided in an order in which the print file is created, an identification number sequentially provided in an order in which the print file is received, and a date on which the print file was created.

If the file name designation mode to modify the file name of the print file is not set using the user interface, the controller may store the print file with the original file name in the folder.

The storage part may include a plurality of folders in which the storage environment of each folder is set separately.

The foregoing and other aspects and utilities of the present general inventive concept may also be achieved by providing a print file storage method in an image forming device including confirming settings of a storage environment in a folder to store a print file, modifying a file name of the print file according to the settings of the storage environment in the folder, and storing the print file with the modified file name.

The method may further include receiving the print file from an external apparatus, and performing the confirming, modifying, and storing if a folder which stores the received print file is selected from among existing folders.

At this time, the file name of the print file is modified to either a folder name or a file name set in the storage environment.

It may be confirmed whether a file name designation mode to modify the file name of the print file is set or not, and the file name of the print file is modified if the file name designation mode is set.

It may be confirmed whether an additional name designation mode to provide an additional name of the print file is set or not, the additional name may be provided to the modified file name.

Additionally, it may be confirmed whether the file name designation mode to modify the file name of the print file is set or not. The method may further include storing the print file with the original file name in the folder if the file name designation mode is not set.

It may be confirmed whether the additional name designation mode for providing an additional name for the print file is set or not, and the additional name may be provided to the original name of the print file.

The additional name may include at least one selected from an identification number sequentially provided in the order in which the print file is created, an identification number sequentially provided in the order in which the print file is received, and a date on which the print file was created.

The method may further include selecting a file name setting mode to set the storage environment, selecting a folder to store the print file in the file name designation mode, and setting the storage environment of the selected folder.

The setting of the storage environment may include setting the setting name used as the file name of the print file in the file name designation mode, and the additional name, selecting a name from among the folder name and the setting name to be used as the file name of the print file, and selecting whether the file name designation mode and the additional name designation mode are used or not.

The foregoing and/or other aspects and utilities of the present general inventive concept may also be achieved by providing a printing system to print an image, including an external host apparatus to transmit a print file and a file name, an image forming device to print an image on a recording medium including a storage part which comprises a folder to store the print file, and a controller which modifies the file name of the print file according to settings of a storage environment of the folder when the print file is stored in the folder.

The foregoing and/or other aspects and utilities of the present general inventive concept may also be achieved by providing a computer-readable recording medium having embodied thereon a computer program to execute a print file storage method in an image forming device, the method including confirming settings of a storage environment in a folder to store a print file, modifying a file name of the print file according to the settings of the storage environment in the folder, and storing the print file with the modified file name.

The foregoing and/or other aspects and utilities of the present general inventive concept may also be achieved by providing a print file storage method in an image forming device, the method including selecting a folder to store a print file, setting a storage environment of the folder, modifying a file name of the print file according to the settings of the storage environment in the folder, and storing the print file with the modified file name.

The foregoing and/or other aspects and utilities of the present general inventive concept may also be achieved by providing a computer-readable recording medium having embodied thereon a computer program to execute a print file storage method in an image forming device, the method include selecting a folder to store a print file, setting a storage environment of the folder, modifying a file name of the print file according to the settings of the storage environment in the folder, and storing the print file with the modified file name.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, exemplary embodiments of the present general inventive concept will be described in detail with reference to the accompanying drawings.

Figure 1:
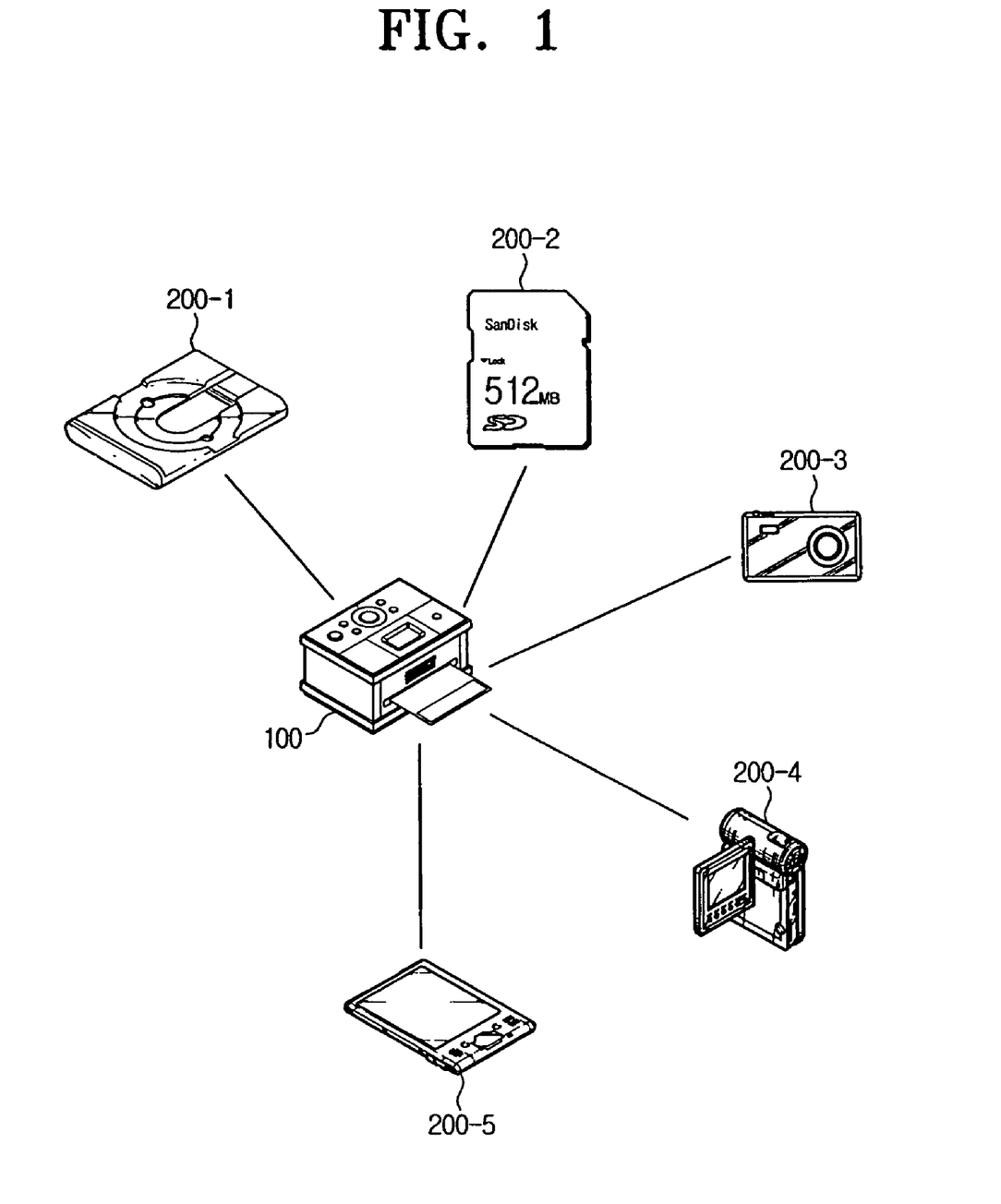
FIG. 1 illustrates a printing system according to an exemplary embodiment of the present general inventive concept.

FIG. 1 illustrates a printing system according to an exemplary embodiment of the present general inventive concept.

Referring to FIG. 1, the printing system according to an exemplary embodiment of the present general inventive concept includes an image forming device 100 and various host apparatuses 200-1 to 200-5.

The image forming device 100 receives a print file transmitted from the host apparatuses 200-1 to 200-5 to print data contained in the print file onto predetermined recording paper, or to function as an electronic album.

The image forming device 100 includes either or both a first communication interface, which is attached to a hard disk drive (HDD) 200-1 or a memory card 200-2 and can receive print files stored in the HDD 200-1 or the memory card 200-2, and a second communication interface, which is connected to a digital camera 200-3, a camcorder 200-4 or a personal digital assistant (PDA) 200-5 and can receive print files stored in each of the host apparatuses 200-3 to 200-5.

In this case, the first communication interface may have a slot structure so that the HDD 200-1 and the memory card 200-2 can be directly mounted. The second communication interface may have structures such as a universal serial bus (USB) port, an infrared transmission port or the like.

The image forming device 100 may include, for example, a duplicator, a printer, a facsimile machine or a multi function peripheral (MFP) which combines functions of the preceding apparatuses in one apparatus, and may additionally include a photo printer to directly receive image files captured by a digital camera to print image files onto the predetermined recording paper.

The image forming device 100 is described in detail below.

Figure 2:
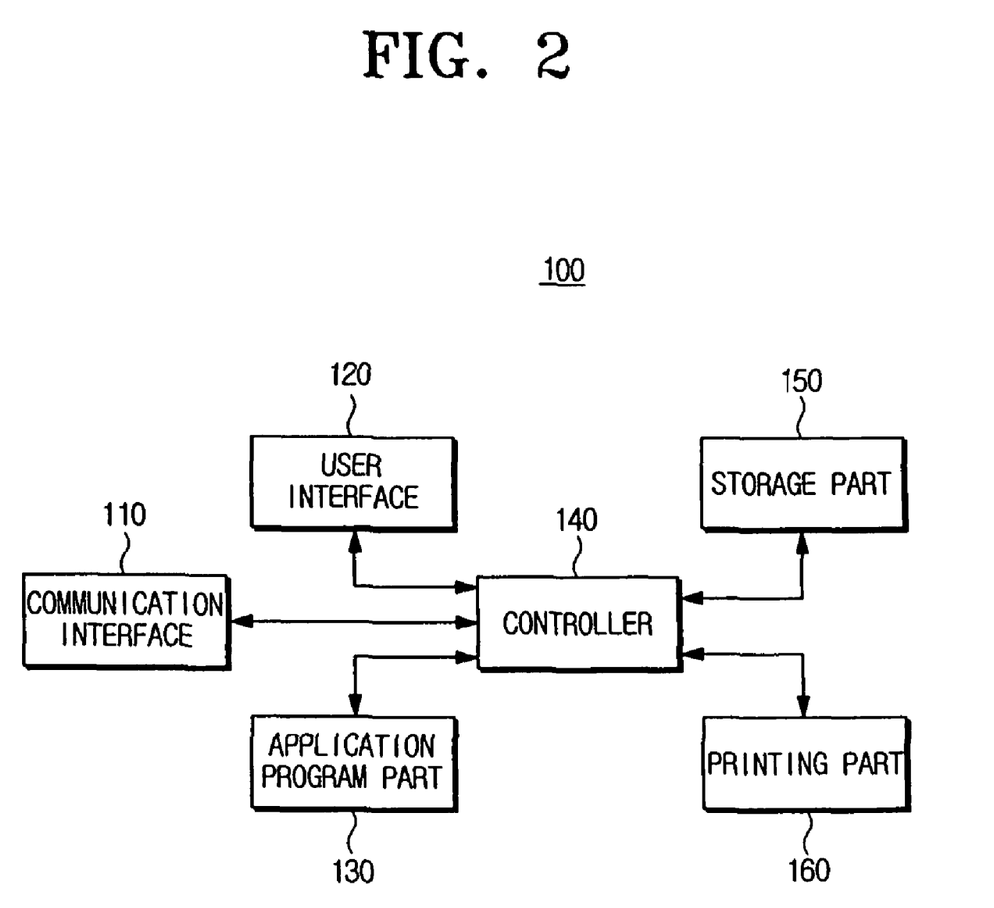
FIG. 2 is a schematic block diagram illustrating an image forming device according to an exemplary embodiment of the present general inventive concept.

FIG. 2 is a schematic block diagram illustrating an image forming device 100 according to an exemplary embodiment of the present general inventive concept.

Referring to FIG. 2, the image forming device 100 according to an exemplary embodiment of the present general inventive concept includes a communication interface 110, a user interface 120, an application program part 130, a controller 140, a storage part 150 and a printing part 160.

Specifically, the communication interface 110 is connected to external apparatuses 200-1 to 200-5 illustrated in FIG. 1, to provide the print files transmitted from the external apparatuses 200-1 to 200-5, to the image forming device 100.

At this time, when the print files transmitted from the external apparatuses 200-1 to 200-5 are stored in the HDD 200-1 or the memory card 200-2, the print files have file names designated by the host apparatus which stores data in the HDD 200-1 or the memory card 200-2, or file names designated by a user. Accordingly, the print file with a predetermined file name is provided inside the image forming device 100 through the communication interface 110.

The user interface 120, as an input part, receives a user command to perform various functions of the image forming device 100, and a set command to set a printing environment in the image forming device 100 from the user, to provide commands to the controller 140. Accordingly, the user interface 120 may include, for example, various manipulation keys so as to apply the user command or the set command. Additionally, the user interface 120 may be a display which is formed with a liquid crystal display panel (touch screen panel) including a touch screen function, so that it is possible to apply the user command or the set command.

In addition, according to the exemplary embodiment of the present general inventive concept, the user interface 120 may receive commands to set a file name designation mode, a file name setting mode and an additional name designation mode, and a setting name of the print file contained in the storage environment information, from the user, and to provide them to the controller 140.

The user interface 120, as a display, may display print state information such as error information detected during printing, a setting screen of the file name designation mode in which the file name of the print file provided through the communication interface 110 can be changed, and a setting screen of the file name setting mode in which a folder to store the print file is designated in the file name designation mode and a storage environment of the designated folder is set, under control of the controller 140.

At this time, the user interface 120 is formed with the touch screen panel, and may combine functions of the input part and the display accordingly. Additionally, the user interface 120 may be implemented to display only predetermined information and screens as described above on the display, and perform a function of the display to allow setting contents displayed on a screen to be displayed through manipulation of keys formed in the input part.

The application program part 130 is executed under the control of the controller 140, allows the above-described setting screens to be displayed on the user interface 120, and stores application programs to modify the file name of the print file provided through the communication interface 110.

The controller 140 executes the application programs stored in the application program part 130, to control the setting screen of the file name setting mode to be displayed on the user interface 120. Additionally, when the storage environment of the folder is set by the key input of the user, the controller 140 stores the set storage environment. Furthermore, the controller 140 controls the setting screen of the file name designation mode to be displayed on the user interface 120, and modifies the file name of the print file transmitted through the communication interface 110, to store the file name in the storage part 150 if the file name designation mode is selected by the key input of the user.

In this case, if the file name designation mode is selected by the key input of the user, the controller 140 determines whether the file name designation mode is set in the storage environment of the folder or riot, and as a result, if the file name designation mode is set, the file name of the print file is modified according to the set storage environment.

The storage environment may include a setting name of the print file designated by the user, and first name selection information, which determines whether the file name of the print file stored as the setting name in the file name designation mode, or the file name of the print file stored as the name of the predefined folder is modified. Accordingly, it is possible to automatically modify and store the file name of the print file stored as the setting name or the name of the predefined folder according to the set storage environment.

In addition, the controller 140 executes the application programs to control the setting screen of the additional name designation mode to be displayed on the user interface 120. The term "additional name" may refer to at least one of the date on which the print file transmitted through the communication interface 110 was created, an identification number provided in an order in which the print file is created, and an identification number provided in an order in which the print file is transmitted. Such an additional name includes information which is preset at each print file to be transmitted.

The setting screen of the additional name designation mode and the setting screen of the file name designation mode may be combined in one setting screen. In this case, the storage environment may include second name selection information which determines whether to modify the file name by combining the additional name with the file name.

If the additional name designation mode is selected by the user, the controller 140 determines whether the additional name designation mode is set in the storage environment of the folder, combines the additional name with the stored setting name or the name of the predefined folder, and stores the print file having the combined file name in the storage part 150.

Similarly, if the file name designation mode is not selected by the user, the controller 140 can store the file name of the print file, which has the file name designated in the host apparatus and is transmitted to the communication interface 110, in the storage part 150 without modifying the file name.

In this case, if the additional name designation mode is selected by the user, the controller 140 determines whether the additional name designation mode is set in the storage environment of the folder, and as a result, if the additional name designation mode is set, the controller 140 may combine the file name of the print file without modification with the additional name, and store the print file with the combined file name in the storage part 150.

The storage part 150 stores the print file with the modified file name under the control of the controller 140. Accordingly, the storage part 150 includes at least one folder to store the print file, and each folder stores the print file according to the set storage environment.

The printing part 160 reads the print file stored in the storage part 150 under the control of the controller 140, and prints image data contained in the print file on the predetermined recording paper. Accordingly, the printing part 160 is loaded with recording paper, transfers the recording paper, forms a predetermined image onto the recording paper, and discharges the recording paper having printed images. According to a constitution of the printing part 160, for example, the image forming device can be a printer such as a laser printer, an inkjet printer, a photo printer or the like.

Figure 3:
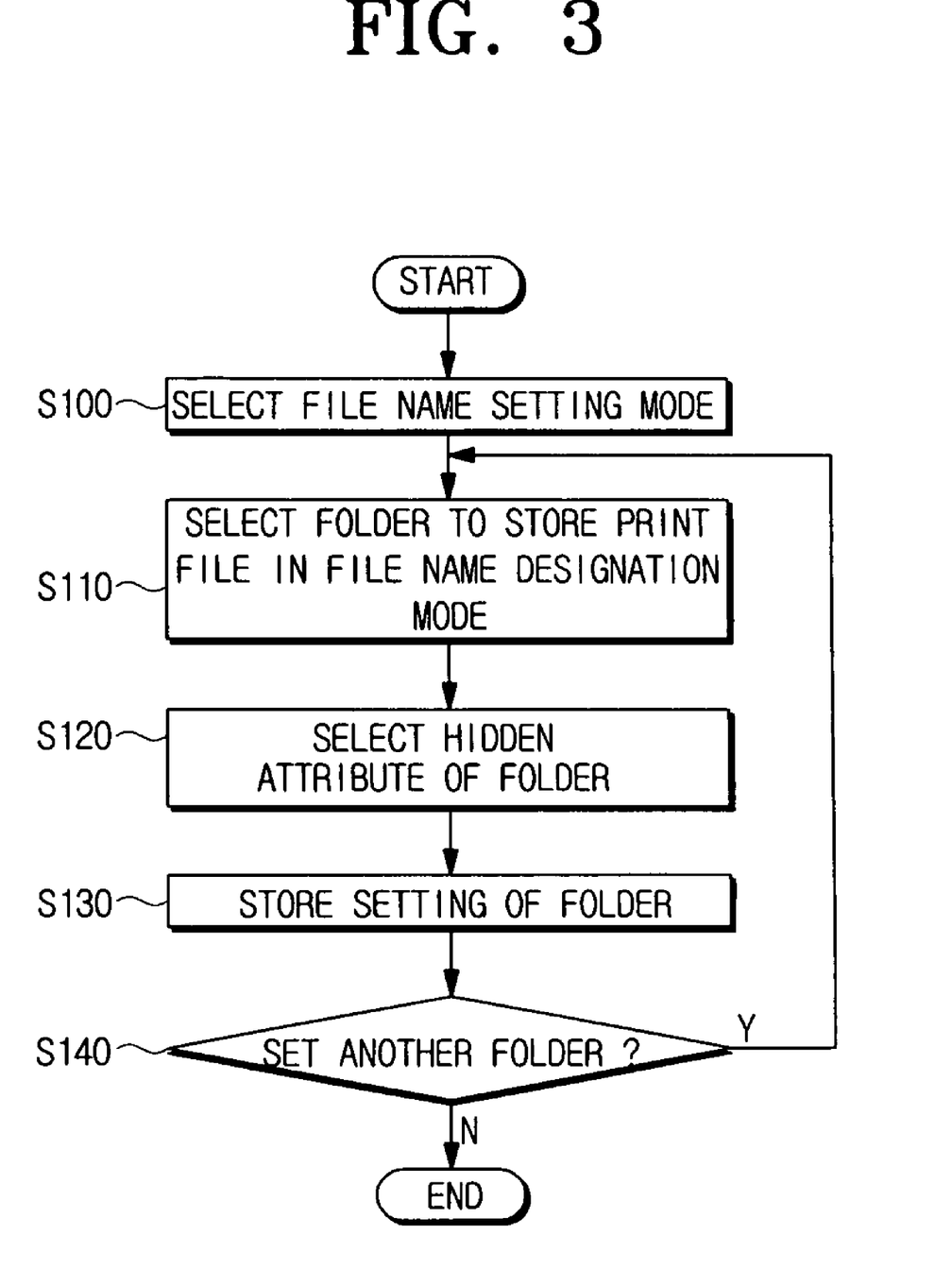
FIG. 3 is a flowchart illustrating a print file storage method of an image forming device according to an exemplary embodiment of the present general inventive concept.
Figure 4:
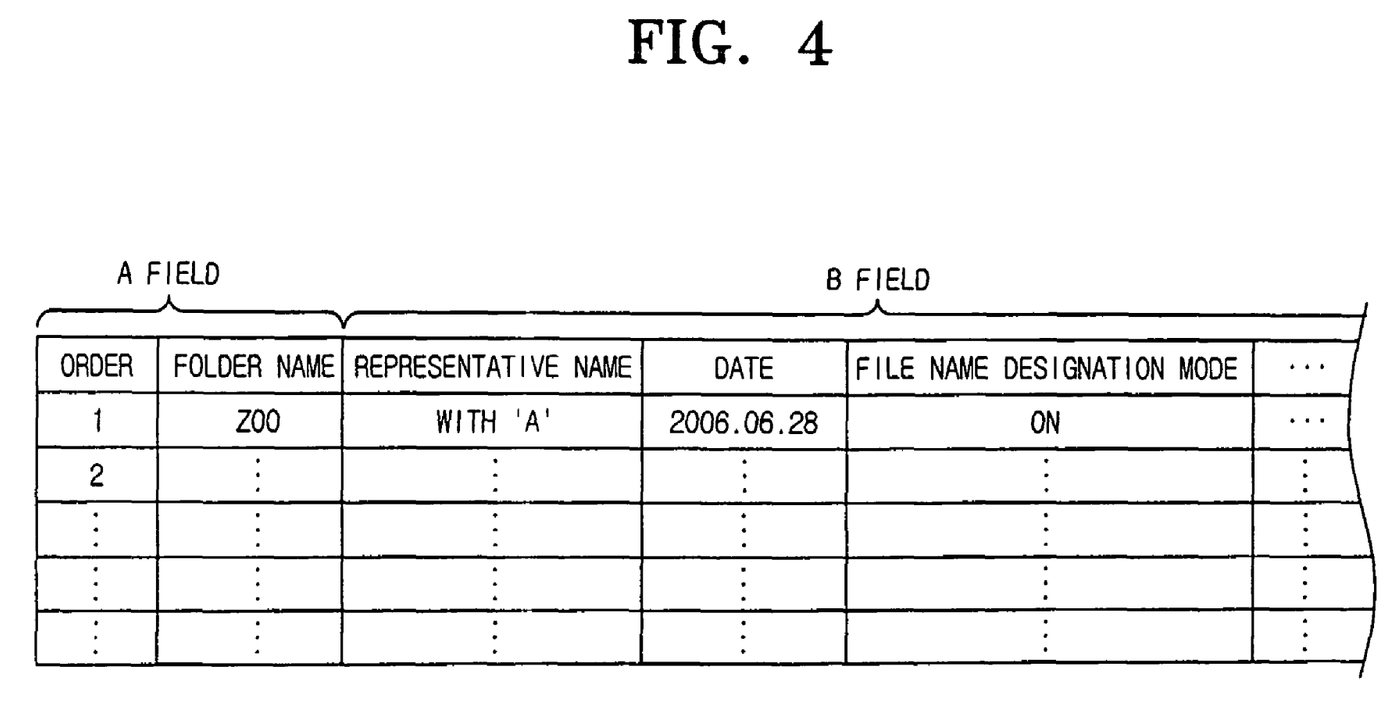
FIG. 4 is a schematic view illustrating a file system used in exemplary embodiments of the present general inventive concept.

FIG. 3 is a flowchart illustrating a print file storage method of an image forming device according to an exemplary embodiment of the present general inventive concept, and FIG. 4 is a schematic view illustrating a file system used in exemplary embodiments of the present general inventive concept. In particular, FIG. 3 illustrates a method of setting the storage environment of the folder included in the storage part 150 of the image forming device 100.

Referring to FIGS. 2 and 3, the print file storage method of the image forming device according to an exemplary embodiment of the present general inventive concept includes selecting the file name setting mode (operation S100), selecting the folder to store the print file in the file name designation mode (operation S110), selecting a hidden attribute of the folder (operation S120), storing a setting of the folder (operation S130), and determining a setting of another folder (operation S140).

In operation S100, the user inputs a command to drive the image forming device 100 in the file name setting mode through the setting screen of the file name setting mode displayed on the user interface 120. In this case, the controller 140 executes the application program based on the inputted command, to control a detail setting screen of the file name setting mode to be displayed on the user interface 120.

In operation S110, the user selects the folder to store the print file in the file name designation mode from among one or more folders included in the storage part 150, through the detail setting screen. The controller 140 sets the selected folder as a folder to store the print file in the file name designation mode.

In operation S120, the user selects hidden attributes of the folder through the detail setting screen. "Selecting hidden attributes" is generally meant to selectively manage information in a table in a hidden attribute field, when the file system illustrated in FIG. 4 includes a display attribute field (A field) displayed on the user interface 120 (refer to FIG. 2) to manage the files, and the hidden attribute field (B field) used to manage the files even though it is not displayed in order to be recognized by the user. For example, the folder name which classifies the folders included in the storage part 150 (refer to FIG. 2), and an order number which classifies and files the folders may be stored in a table in the display attribute field (A field). Additionally, a date of creating the folder, setting information of the file name designation mode, a setting name used in the files stored in the folder (hereinafter, referred to as a representative name), and the first and second name selection information may be stored in the hidden attribute field (B field). Therefore, the above file system may have a structure of a file system provided in IBM Personal Computers (PCs), and may also be used as the storage environment of the folder.

For example, the user may selectively store the representative name of the print file in the file system, and may store the setting information on the file name designation mode directing whether each folder is used in the file name designation mode or not (On/Off). Additionally, the user may selectively store the first name selection information showing which one of the folder name and the representative name is used as a file name for files stored in the folder, and the second name selection information showing whether the additional name designation mode is used in each folder.

When the print file is stored according to the storage environment of the selected folder, the file name of the print file automatically stored according to the folder name and the representative name may be set and modified by combining the additional name with the decided file name.

Referring again to FIG. 3, in operation S130, the storage environment including the hidden attributes set at step S120 or the like is stored.

In operation S140, the controller 140 displays the setting screen requiring the user to determine whether the storage environment of another folder is set on the user interface 120, performs operation S110 if the user requires another folder to be set, and terminates the setting of the storage environment of the folder if the user does not require another folder to be set.

Figure 5:
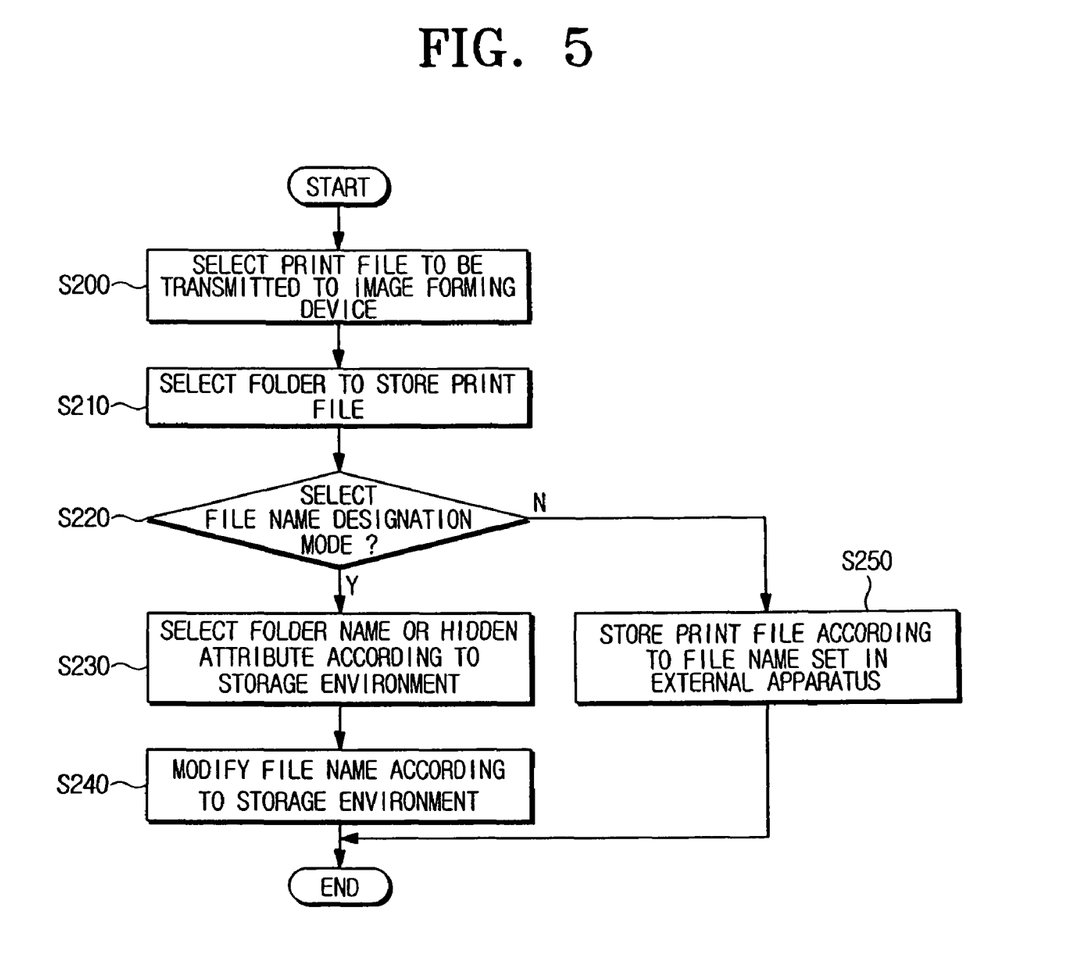
FIG. 5 is another flowchart illustrating a print file storage method of an image forming device according to an exemplary embodiment of the present general inventive concept.

FIG. 5 is another flowchart illustrating a print file storage method of an image forming device according to an exemplary embodiment of the present general inventive concept. In particular, FIG. 5 illustrates a print file storage method in the folder, in which the storage environment is set as illustrated in FIG. 3.

Referring to FIGS. 2 to 5, the print file storage method of the image forming device according to an exemplary embodiment of the present general inventive concept, includes selecting the print file to be transmitted to the image forming device (operation S200), selecting the folder to store the print file to be transmitted (operation S210), determining whether the file name designation mode is selected (operation S220), selecting the folder name or the hidden attribute according to the storage environment of the selected folder if the file name designation mode is selected (operation S230), modifying the file name of the print file according to the set storage environment (operation S240), and storing the print file according to the file name set in an external host apparatus if the file name designation mode is not selected (operation S250).

In operation S200, the user selects the print file transmitted to the image forming device 100 from among print files stored in the external host apparatus connected to the image forming device 100 through the user interface 120.

In operation S210, the user selects the folder to store the print file selected at operation S200 through the user interface 120. At this time, the storage environment of the selected folder is set using the steps illustrated in FIG. 3.

In operation S220, the controller 140 determines whether the user selects the file name designation mode through the user interface 120.

In operation S230, as a result of operation S220, if the user selects the file name designation mode, the controller 140 determines which one of the folder name and the representative name is set to be used as a file name of the stored print file, in the storage environment illustrated in FIG. 4, that is, the file system. In other words, the controller 140 interprets the setting of the first name selection information, and selects either the folder name or the representative name as a file name according to the interpreted setting.

In operation S240, the controller 140 also determines whether the additional name designation mode is set in the selected folder, that is, interprets the setting of the second name selection information. If the additional name designation mode is set, the controller 140 combines the selected file name with the additional name, such as a date on which the file was created, an identification number sequentially provided in an order in which the print file is created, and an identification number sequentially provided in an order in which the print file is transmitted, and modifies the file name of the print file transmitted from the external host apparatus. The modified file name is then stored in the storage part 150.

When the file name of the print file stored in the image forming device is modified through the above steps, it changes as follows using, for example, the file system illustrated in FIG. 4.

Referring to FIG. 4, when the print file is stored in a first folder (order 1), a print file transmitted from the external host apparatus may be applied to the image forming device having a file name 'DSCSEC00001.jpg'. When the folder name (zoo) of the designated folder is selected as the file name, the print file stored in the designated folder is modified to have the file name 'zoo.jpg', and when the representative name (with A) is selected as the file name, the print file stored in the designated folder is modified to have the file name 'with A.jpg.' Additionally, if the additional name designation mode is set, each of the above files is modified to have the file names, 'zoo_20060628_001' and 'with A_20060628_001'. A subsequent file is modified to have the file names, 'zoo_20060628_002' and 'with A_20060628_002' by the additional name designation mode.

In operation S250, as the result of operation S220, if the user does not select the file name designation mode, the print file with the file name set in the external host apparatus is stored in the storage part 150.

In the exemplary embodiments of the present general inventive concept, before the print file storage method in the folder having the set storage environment illustrated in FIG. 5 is performed, the method of setting the storage environment of the folder in FIG. 3 is performed to collectively set the storage environment of the folder to store the print file. However, the exemplary embodiments of the present general inventive concept may be implemented by various modifications apparent to those skilled in the art, for example, if the method of FIG. 3 further includes determining whether the file name designation mode is used or not before operation S100, and as a result, if the file name designation mode is not used, the storage environment of the folder is not set.

As described above, according to embodiments of the present general inventive concept, when the print file transmitted from the external host apparatus is stored, the file name of the print file is automatically modified and stored according to the folder name designated by the user or the setting name. Therefore, it is possible to avoid any inconvenience caused by modification of the file name of each print file using another external host apparatus such as a computer, and to use the image forming device more easily.

Additionally, without using another external host apparatus such as a computer, it is possible to prevent problems such as existing files being deleted because of files being stored with identical file names in the storage apparatus, or names of files being simplified when stored.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains. The methods illustrated in FIGS. 3 and 5 can be stored in the computer-recorded medium in a form of computer-readable codes to perform the method when the computer reads the computer-readable codes of the recording medium.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming device comprising:
   a storage part which comprises a folder to store a print file;
   a user interface to set a storage environment of the folder, the set storage environment of the folder including name selection information, a folder name of the folder, and a setting name;
   a controller which selects a name from among the folder name and the setting name according to the name selection information and modifies a file name of the print file to include the selected name when the print file is stored in the folder; and
   a communication interface which communicates with an external apparatus to receive the print file,
   wherein the controller stores the received print file in the folder included in the storage part.

2. The device as claimed in claim 1, wherein the controller modifies the file name of the print file to either a folder name or the file name set in the storage environment.

3. The device as claimed in claim 1,
   wherein the controller modifies the file name of the print file if a file name designation mode to modify the file name of the print file is set using the user interface.

4. The device as claimed in claim 3, wherein the controller provides an additional name to either an original name or the modified file name of the print file if an additional name designation mode to provide the additional name to the print file is set using the user interface.

5. The device as claimed in claim 4, wherein the additional name comprises at least one selected from an identification number sequentially provided in an order in which the print file is created, an identification number sequentially provided in an order in which the print file is received, and a date on which the print file was created.

6. The device as claimed in claim 3, wherein the controller stores the print file with an original file name in the folder if the file name designation mode to modify the file name of the print file is not set using the user interface.

7. The device as claimed in claim 1, wherein the storage part comprises a plurality of folders in which the storage environment of each folder is set separately.

8. The device as claimed in claim 1, wherein the controller modifies the file name of the print file to the folder name set in the storage environment.

9. A print file storage method in an image forming device, the method comprising:
   confirming settings of the storage environment in a folder to store a print file, the settings of the storage environment in the folder including name selection information, a folder name of the folder, and a setting name;
   selecting a name from among the folder name and the setting name according to the name selection information;
   modifying a file name of the print file to include the selected name;

storing the print file with the modified file name in the folder;

receiving the print file from an external apparatus; and performing the confirming, modifying, and storing if a folder to store the received print file is selected from among existing folders.

10. The method as claimed in claim 9, wherein the modifying of the file name modifies the file name of the print file to either a folder name or the file name set in the storage environment.

11. The method as claimed in claim 9, wherein the confirming of the settings confirms whether a file name designation mode to modify the file name of the print file is set or not, and the modifying of the file name modifies the file name of the print file if the file name designation mode is set.

12. The method as claimed in claim 9, wherein the confirming of the settings confirms whether an additional name designation mode which provides an additional name for the print file is set or not, and the modifying of the file name provides the additional name to the modified file name.

13. The method as claimed in claim 9, wherein the confirming of the settings confirms whether the file name designation mode to modify the file name of the print file is set or not, further comprising storing the print file with the original file name in the folder if the file name designation mode is not set.

14. The method as claimed in claim 9, wherein the confirming of the settings confirms whether the additional name designation mode to provide an additional name for the print file is set or not, and the modifying of the file name provides the additional name to an original name of the print file.

15. The method as claimed in claim 14, wherein the additional name comprises at least one selected from an identification number sequentially provided in an order in which the print file is created, an identification number sequentially provided in an order in which the print file is received, and a date on which the print file was created.

16. The method as claimed in claim 9, further comprising:

selecting a file name setting mode to set the storage environment;

selecting a folder to store the print file in a file name designation mode; and setting the storage environment of the selected folder.

17. The method as claimed in claim 16, wherein the setting of the storage environment comprises:

setting the setting name used as the file name of the print file in the file name designation mode, and an additional name; and selecting whether the file name designation mode and an additional name designation mode are used or not.

18. The method as claimed in claim 9, wherein the modifying of the file name modifies the file name of the print file to the folder name set in the storage environment.

19. A printing system to print an image, comprising:

an external host apparatus to transmit a print file and a file name;

an image forming device to print an image on a recording medium comprising:

a storage part which comprises a folder to store the print file, a user interface to set a storage environment of the folder, the set storage environment of the folder including name selection information, a folder name of the folder, and a setting name, and a controller which selects a name from among the folder name and the setting name according to the name selection information and modifies the file name of the print file to include the selected name when the print file is stored in the folder.

20. The printing system of claim 19, wherein the image forming device comprises one of a duplicator, printer, facsimile machine, a photo printer, or a multi function peripheral (MFP).

21. The printing system of claim 19, wherein the external host apparatus comprises one of a hard disk drive (HDD), a memory card, a digital camera, a camcorder, or a personal digital assistant (PDA).

22. A non-transitory computer-readable recording medium having embodied thereon a computer program to execute a print file storage method in an image forming device, the method comprising:

confirming settings of a storage environment in a folder to store a print file, the settings of the storage environment including name selection information, a folder name of the folder, and a setting name;

selecting a name from among the folder name and the setting name according to the name selection information;

modifying a file name of the print file to include the selected name; and storing the print file with the modified file name in the folder;

receiving the print file from an external apparatus; and performing the confirming, modifying, and storing if a folder to store the received print file is selected from among existing folders.

23. A print file storage method in an image forming device, the method comprising:

selecting a folder to store a print file;

setting a storage environment of the folder including selecting a hidden attribute of the selected folder;

modifying a file name of the print file according to the settings of the storage environment in the folder; and storing the print file with the modified file name.

24. The method of claim 23, wherein the hidden attribute is a date of creation of the folder.

25. The method of claim 23, wherein the hidden attribute is a representative name representative of print files stored in the folder.

26. The method of claim 23, wherein the modifying of the file name of the print file comprises:

adding an additional name to the file name of the print file.

27. The method of claim 26, wherein the additional name is one of a date of creation of the print file, an identification number sequentially provided in an order in which the print file is created, and an identification number sequentially provided in an order in which the print file is received.

28. A non-transitory computer-readable recording medium having embodied thereon a computer program to execute a print file storage method in an image forming device, the method comprising:

selecting a folder to store a print file;

setting a storage environment of the folder including selecting a hidden attribute of the selected folder;

modifying a file name of the print file according to the settings of the storage environment in the folder; and storing the print file with the modified file name.

* * * * *